(12) United States Patent
Rosenberg

(10) Patent No.: US 8,473,408 B2
(45) Date of Patent: Jun. 25, 2013

(54) INVESTMENT STRUCTURE AND METHOD HAVING FIXED AND CONTINGENT COMPONENTS

(75) Inventor: Mark Rosenberg, Poundridge, NY (US)

(73) Assignee: Ssaris Advisors, LLC, Wilton, CT (US)

( * ) Notice: Subject to any disclaimer, the term of this patent is extended or adjusted under 35 U.S.C. 154(b) by 0 days.

(21) Appl. No.: 12/961,278

(22) Filed: Dec. 6, 2010

(65) Prior Publication Data

US 2011/0112949 A1    May 12, 2011

Related U.S. Application Data

(63) Continuation of application No. 10/460,487, filed on Jun. 13, 2003.

(51) Int. Cl.
*G06Q 40/00* (2012.01)
(52) U.S. Cl.
USPC .............. 705/38; 705/36 R; 705/500; 705/64; 705/30
(58) Field of Classification Search
CPC .................................................... G06Q 40/00
USPC ................................... 705/36 R, 500, 64, 30
See application file for complete search history.

(56) References Cited

U.S. PATENT DOCUMENTS

| | | | |
|---|---|---|---|
| 5,193,056 A | 3/1993 | Boes | |
| 5,864,685 A | 1/1999 | Hagan | |
| 2002/0019793 A1* | 2/2002 | Frattalone | 705/36 |

OTHER PUBLICATIONS

MAR Structured Products, Jun. 1999, "Rated notes open doors", 1 p.p.*
Security Agreement, between RXR Holdings LL, and a Secured Party, Oct. 15, 1998, 10 p.p.*
Pledged Account Agreement, Oct. 15, 1998, between RXR Holdings LLC, RXR Holdings Trading L.P., a secured party, and a custodian, 9 p.p.
Investment Management Agreement, Oct. 13, 1998, between RXR Capital Management, Inc. and a Trustee, 9 p.p.
Face of Note, RXR Holdings LLC Oct. 15, 1998, 4 p.p.
Note Purchase Agreement RXR Holdings Secured Participating Notes, Oct. 20, 1998, 3 p.p.
Summary of Terms and Conditions for RXR Holdings Secured Participating Notes, undated, 6 p.p.
Money Management Letter, Apr. 5, 1999, www.iinews.com, "Marketing Strategies", 1 p.p.
Letter from Standard & Poor's Ratings Services, Aug. 7, 1998, to The RXR Group, Inc., 1 p.p.
Article, "Deconstructing Structured Products" by Brad Cole and Rian Akey, Cole Partners LLC, undated.

* cited by examiner

*Primary Examiner* — Daniel Felten
(74) *Attorney, Agent, or Firm* — Andrews Kurth LLP; Sean Wooden; Matthew J. Esserman

(57) ABSTRACT

An investment structure and method including a fixed component and a contingent component for investing funds. The fixed component invests a portion of the funds in fixed income securities and generates principal plus fixed interest. The contingent component invests another portion of the funds in non-fixed income investments and generates contingent interest. The fixed interest is selectively distributed or re-invested in the fixed component, and the contingent interest is re-invested in the contingent component in order to boost the trading pool for that component and potentially increase the return on investment. One or more limited partnerships, limited liability companies, corporations or other limited liability entities invests the contingent component.

10 Claims, 13 Drawing Sheets

INVESTMENT STRUCTURE AND METHOD HAVING FIXED AND CONTINGENT COMPONENTS

RELEVANT APPLICATIONS

This Application is a continuation application of U.S. application Ser. No. 10/460,487, filed on Jun. 13, 2003, which is hereby incorporated by reference in its entirety.

FIELD OF THE INVENTION

The present invention relates to an investment structure and method having fixed and contingent components generating interest that is selectively distributed or re-invested.

BACKGROUND OF THE INVENTION

Investment structures include fixed income securities, such as treasury notes, and non-fixed income investments such as indices, futures, and options. The fixed income securities provide for a reliable return and hence low risk. Non-fixed income investments carry greater risk of loss but also can produce substantially greater returns than fixed income securities. Investors sometimes desire greater returns than a fixed income security provides without the full risk involved with non-fixed income investments.

Accordingly, a need exists for an investment structure that combines the low risk of fixed income securities with the potential for greater returns with non-fixed income investments.

SUMMARY OF THE INVENTION

A method consistent with the present invention provides an investment structure for funds to be invested. The method includes investing a first portion of the funds in a fixed component generating principal plus fixed interest and investing a second portion of the funds in a contingent component generating contingent interest. Investing the second portion includes using one or more limited partnerships, limited liability companies, corporations or other limited liability entities for investing the contingent component. The fixed interest is selectively distributed or re-invested in the fixed component, and the contingent interest is re-invested in the contingent component.

Another method consistent with the present invention provides an investment structure for a plurality of funds to be invested. The method includes investing first portions of the plurality of funds in a pooled fixed component generating principal plus pooled fixed interest. It also includes investing second portions of the plurality of funds in a pooled contingent component generating pooled contingent interest. Using this method, the second portions can be divided and invested between a pooled distribution contingent component and a pooled re-investment contingent component, depending upon whether a portion of the pooled contingent interest is to be distributed. Investing the second portions includes using one or more limited partnerships, limited liability companies, corporations or other limited liability entities for investing the pooled distribution and re-investment contingent components. The pooled fixed interest is selectively distributed or is re-invested in the pooled fixed component. The pooled contingent interest is re-invested in the pooled contingent component, and a portion of it may be selectively distributed from the pooled distribution contingent component.

An investment structure consistent with the present invention includes two components for investing funds. A fixed component invests a first portion of the funds and generates principal plus fixed interest, and a contingent component invests a second portion of the funds and generates contingent interest. The fixed interest is selectively distributed or re-invested in the fixed component, and the contingent interest is re-invested in the contingent component. One or more limited partnerships, limited liability companies, corporations or other limited liability entities invests the contingent component.

Another investment structure consistent with the present invention includes two components for investing multiple funds. A pooled fixed component invests first portions of the funds and generates pooled fixed interest, and a pooled contingent component invests second portions of the funds and generates pooled contingent interest. The pooled fixed interest is selectively distributed or re-invested in the pooled fixed component. The pooled contingent interest is re-invested in the pooled contingent component, and a portion may be selectively distributed. One or more limited partnerships, limited liability companies, corporations or other limited liability entities invests the contingent component.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Investment Structures

Figure 1:
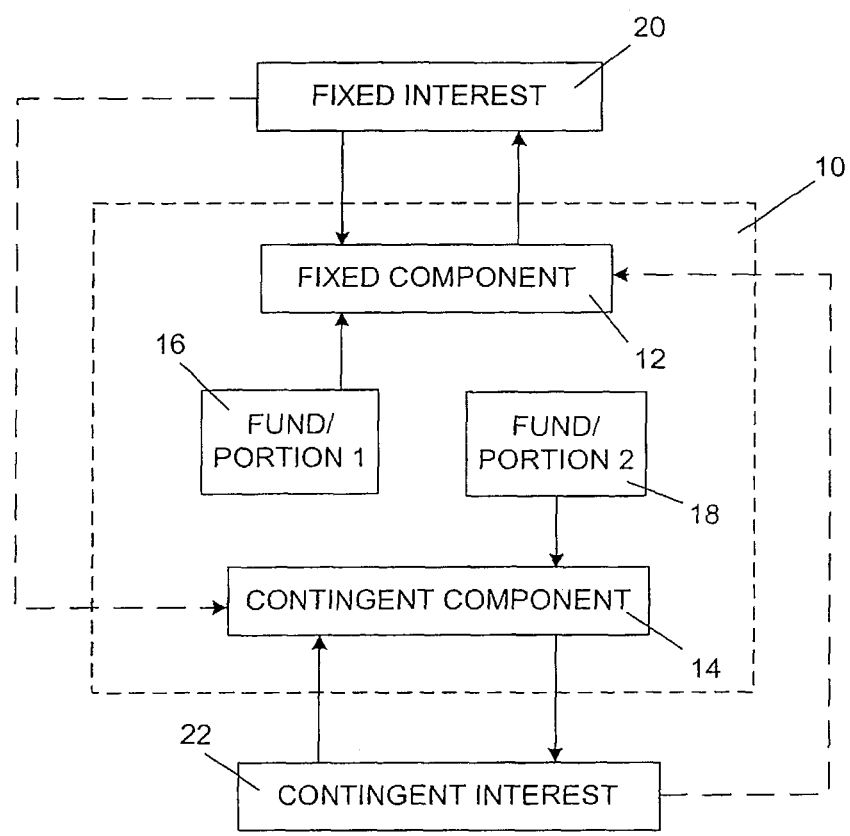
FIG. 1 is a diagram of an investment structure for a single client with fixed and contingent interest re-invested.
Figure 2:
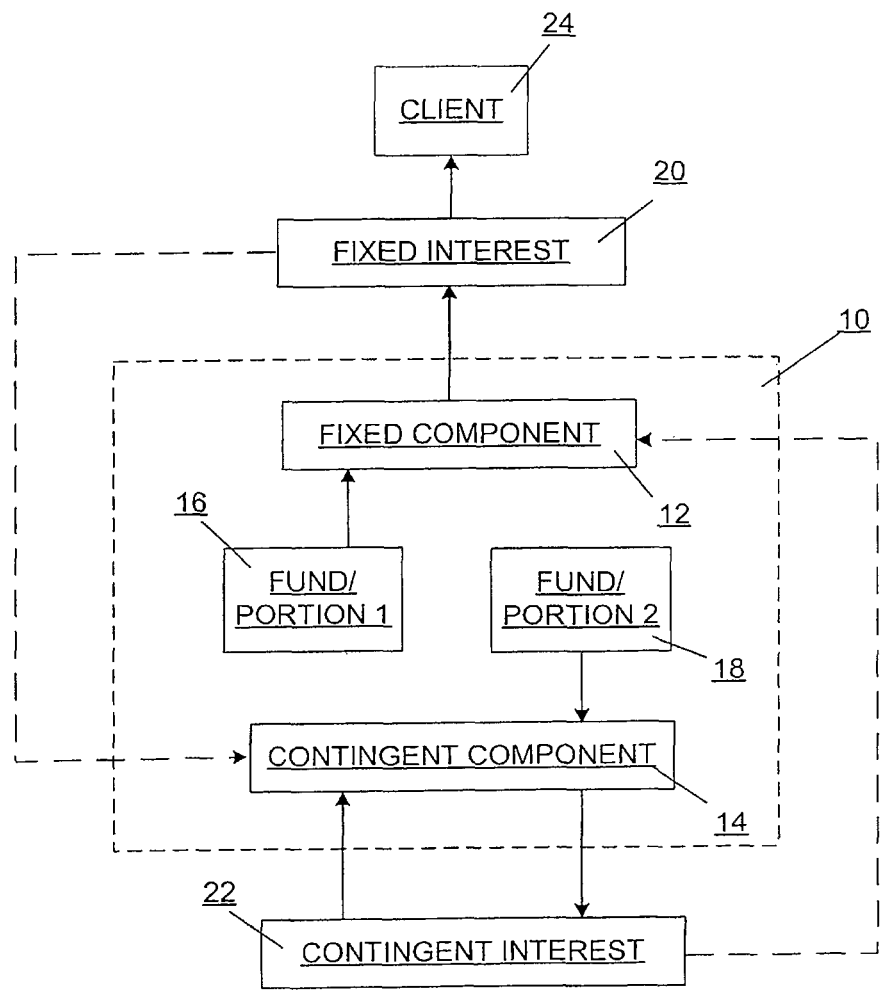
FIG. 2 is a diagram of an investment structure for a single client with contingent interest re-invested and fixed interest distributed.
Figure 3:
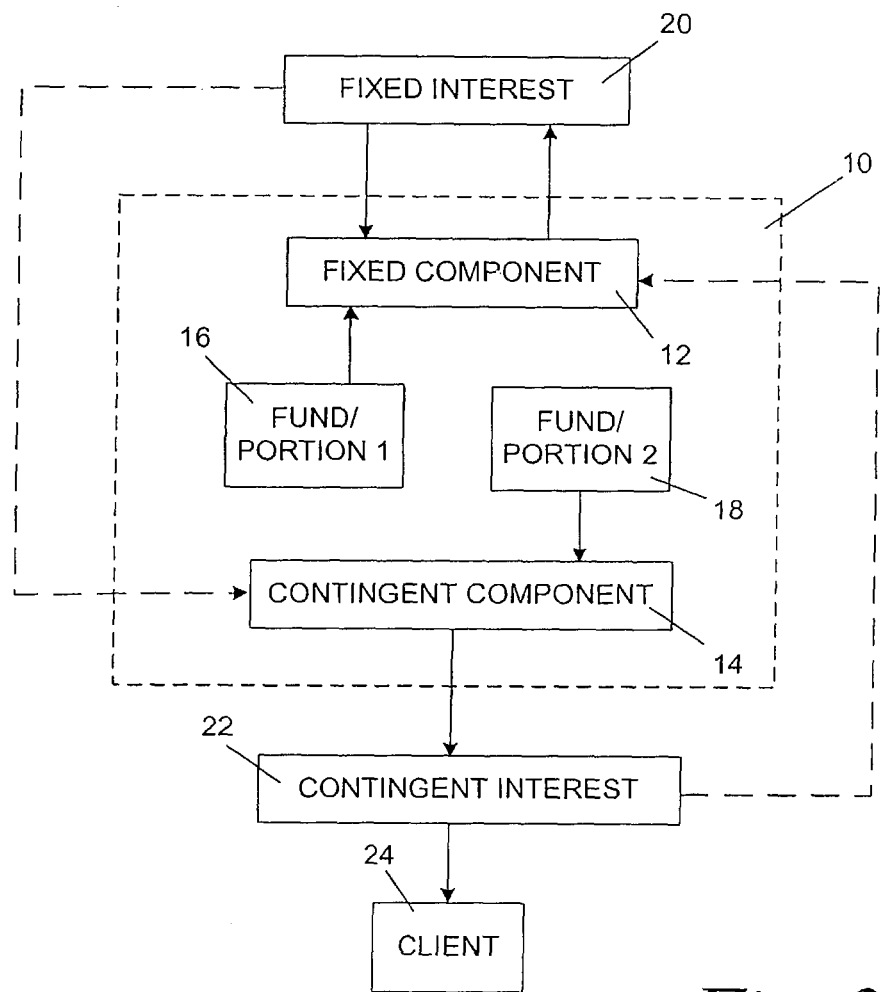
FIG. 3 is a diagram of an investment structure for a single client with contingent interest distributed and fixed interest re-invested.

FIG. 1 is a diagram of an investment structure 10 for a single client with fixed and contingent interest re-invested. FIG. 2 illustrates investment structure 10 with fixed interest distributed and contingent interest re-invested. FIG. 3 illustrates investment structure 10 with fixed interest re-invested and contingent interest distributed. As shown in FIGS. 1-3, investment structure 10 includes funds to be invested, and those funds are divided into two portions 16 and 18. Portion 16 is invested in a fixed component 12, and portion 18 is invested in a contingent component 14. In an exemplary embodiment, sixty to ninety percent of the funds (portion 16) are invested in the fixed component and the remaining ten to forty percent of the funds (portion 18) are invested in the contingent component. However, other percentages or ranges for the two portions may be used.

The term "fixed component" refers to investing in any one or more fixed income securities and examples include, but are not limited to treasury notes, AAA-rated securities, AA-rated securities, municipal bond notes, and variable rate notes. The term "contingent component" refers to any non-fixed income security and examples include, but are not limited to commodities, futures contracts, forward contracts, currencies, swaps, indices, equity and other securities, options and other investments. The term "contingent interest" refers to profits from a trading company or other entity resulting from investing at least a portion of the contingent component. In addition, management fees may be deducted from one or both of the fixed and contingent components.

Fixed component 12 generates principal plus fixed interest 20, which can be re-invested in fixed component 12, as shown in FIGS. 1 and 3, or distributed to a client 24, as shown in FIG. 2. If fixed interest 20 is to be distributed, it is typically distributed on a periodic basis. Contingent component 14 generates contingent interest 22, which can be re-invested in contingent component 14, as shown in FIGS. 1 and 2, or distributed to client 24, as shown in FIG. 3. Re-investing the contingent interest boosts the trading pool for contingent component 14 to help increase the return on investment.

As an alternative shown by the dashed arrows in FIGS. 1-3, a portion of fixed interest 20 can be selectively re-invested in contingent component 14, and a portion of contingent interest 22 can be selectively re-invested in fixed component 12. Also, the distribution of the fixed and contingent interest can include distributing all of the interest or only a portion of it, and the re-investment of the fixed and contingent interest can include re-investing all of the interest or only a portion of it. As another alternative, both the fixed interest and contingent interest can be distributed during the investment period rather than re-invested.

Figure 4:
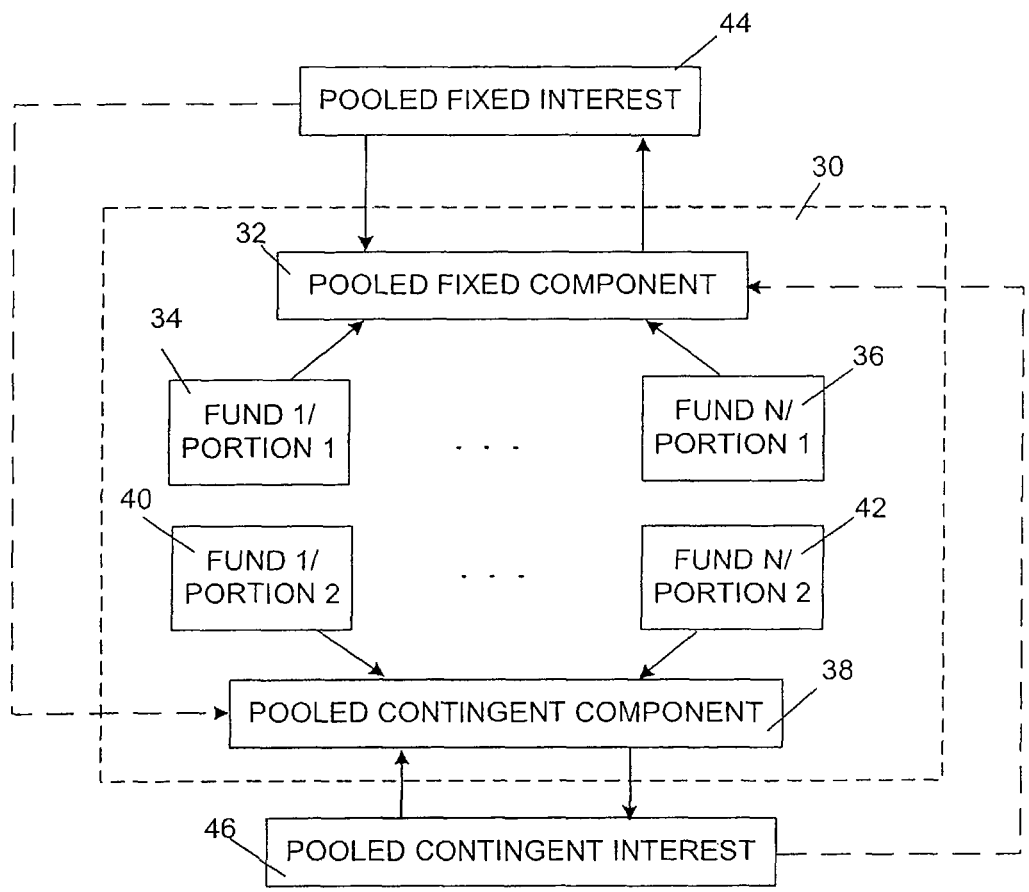
FIG. 4 is a diagram of an investment structure for multiple clients with pooled fixed interest and pooled contingent interest re-invested.
Figure 5:
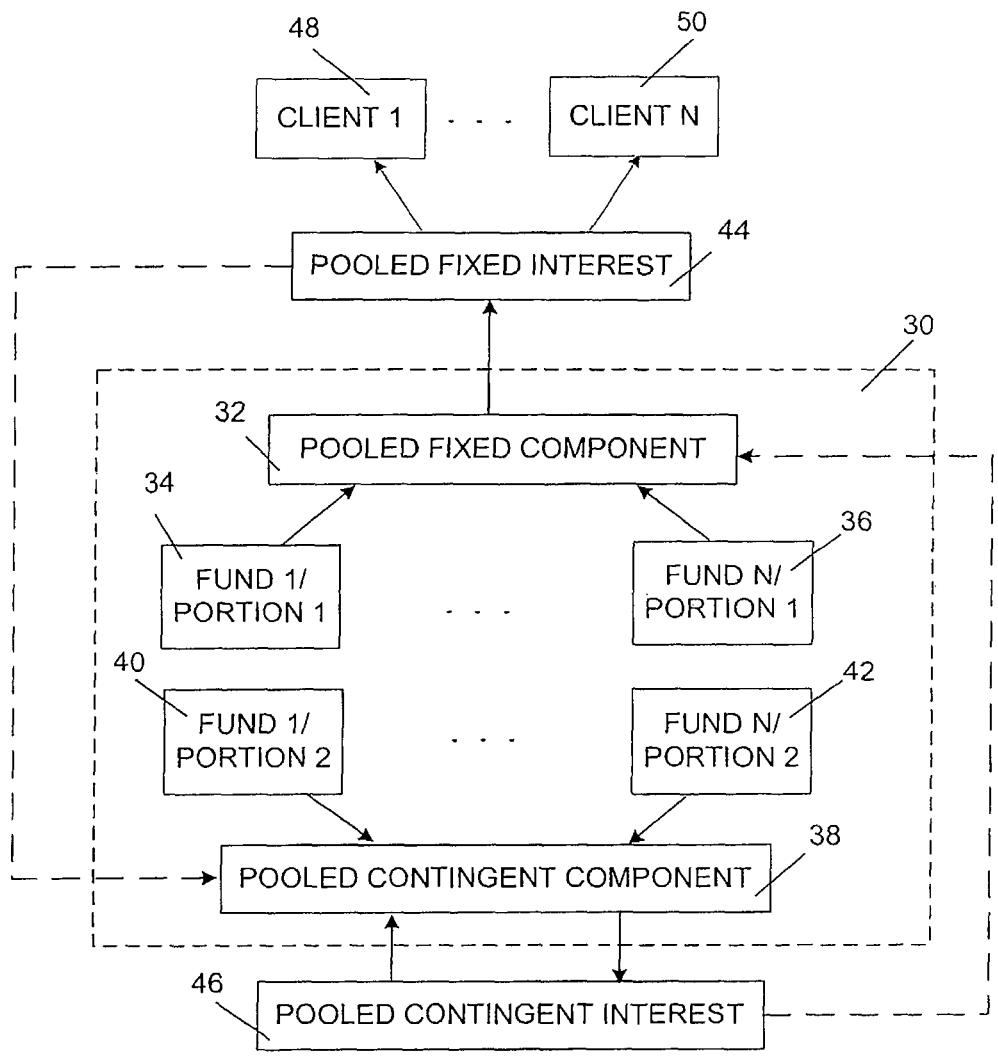
FIG. 5 is a diagram of an investment structure for multiple clients with pooled contingent interest re-invested and pooled fixed interest distributed.

FIG. 4 is a diagram of an investment structure 30 for multiple clients with pooled fixed and contingent interest re-invested, and FIG. 5 illustrates investment structure 30 with pooled fixed interest distributed. As shown in FIGS. 4 and 5, a plurality of funds are divided into first portions 34 and 36, combined, and invested in a pooled fixed component 32. The term a "plurality of funds" refers to funds from multiple clients. The plurality of funds are also divided into second portions 40 and 42, combined, and invested in a pooled contingent component 38. In an exemplary embodiment, sixty to ninety percent of the pooled funds (portions 34 and 36) are invested in the pooled fixed component and the remaining ten to forty percent of the pooled funds (portions 40 and 42) are invested in the pooled contingent component. However, other percentages for the two portions may be used.

The term "pooled fixed component" refers to any fixed component investing multiple client funds. The term "pooled contingent component" refers to any contingent component investing multiple client funds.

Pooled fixed component 32 generates pooled fixed interest 44, which can be re-invested in pooled fixed component 32, as shown in FIG. 4, or distributed to clients 48 and 50, as shown in FIG. 5. Pooled contingent component 38 generates pooled contingent interest 46, which is re-invested in pooled contingent component 38, as shown, to boost the trading pool and potentially increase the return on investment.

Figure 6:
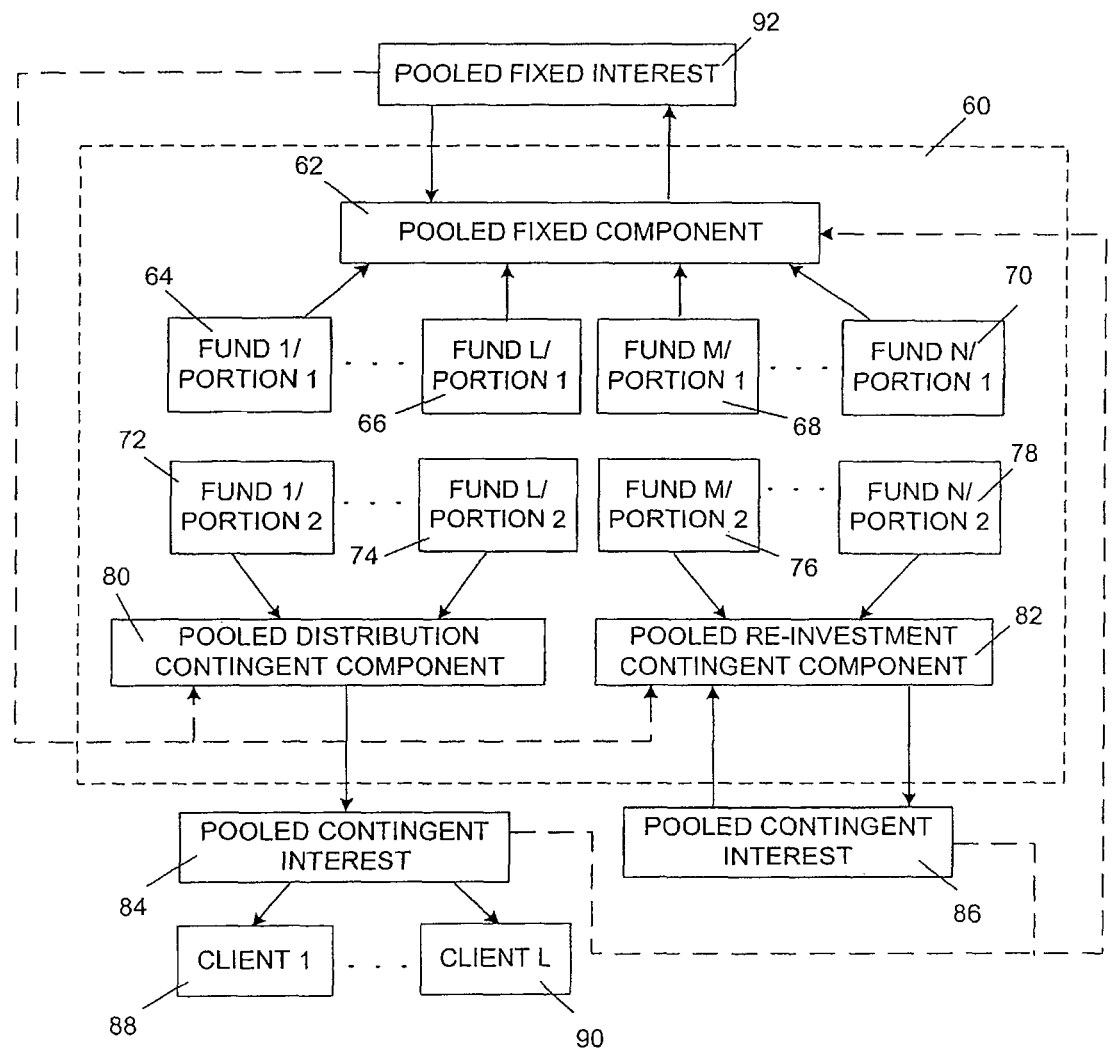
FIG. 6 is a diagram of an investment structure for multiple clients with pooled fixed interest re-invested and with pooled contingent interest selectively re-invested and distributed.
Figure 7:
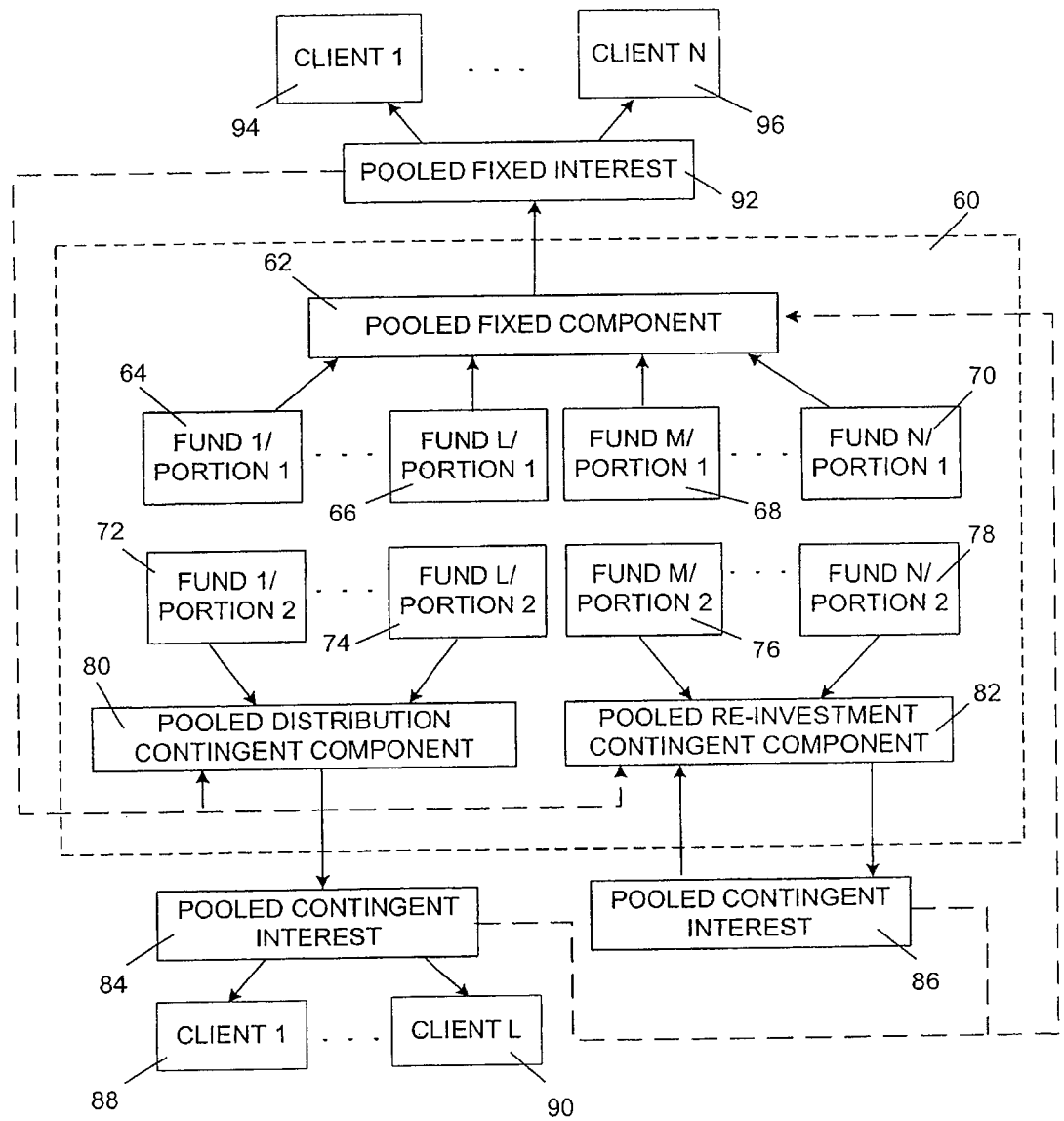
FIG. 7 is a diagram of an investment structure for multiple clients with pooled fixed interest distributed and with pooled contingent interest selectively re-invested and distributed.

FIG. 6 is a diagram of an investment structure 60 for multiple clients with pooled fixed interest re-invested and with pooled contingent interest selectively re-invested and distributed. FIG. 7 illustrates investment structure 60 with pooled fixed interest distributed. As shown in FIGS. 6 and 7, a plurality of funds are divided into first portions 64, 66, 68, and 70, which are combined and invested in a pooled fixed component 62. The funds are also divided into second portions 72, 74, 76, and 78.

For clients desiring distribution of pooled contingent interest, their funds are divided in second portions 72 and 74, which are combined and invested in a pooled distribution contingent component 80. For clients desiring re-investment of pooled contingent interest, their funds are divided in second portions 76 and 78, which are combined and invested in a pooled re-investment contingent component 82. In an exemplary embodiment, sixty to ninety percent of the pooled funds (portions 64, 66, 68, and 70) are invested in the pooled fixed component and the remaining ten to forty percent of the pooled funds (portions 72, 74, 76, and 78) are invested in the pooled distribution contingent component and the pooled re-investment contingent component as shown. However, other percentages for the two portions may be used.

The term "pooled distribution contingent component" refers to any pooled contingent component where the interest generated from it is distributed to the associated clients. The term "pooled re-investment contingent component" refers to any pooled contingent component where the interest generated from it is re-invested in the pooled contingent component.

Pooled distribution contingent component 80 generates pooled interest 84, which is distributed to clients 88 and 90. Pooled re-investment contingent component 82 generates pooled interest 86, which is re-invested in pooled re-investment contingent component 82 as shown. Pooled fixed component 62 generates pooled fixed interest 92, which can be re-invested in pooled fixed component 62, as shown in FIG. 6, or distributed to clients 94 and 96, as shown in FIG. 7.

In investment structures 30 and 60, the pooled fixed interest can be distributed to selected clients and re-invested for other clients. When the pooled fixed interest or pooled contingent interest is distributed in investment structures 30 and 60, it is typically distributed to clients on a pro rata basis depending upon the percentage of funds each client invested. The investment structures can track the percentage of funds invested by each client in order to calculate what percentage of the interest to distribute to each particular client.

As an alternative shown by the dashed arrows in FIGS. 4-7, a portion of the pooled fixed interest can be selectively re-invested in one or more of the pooled contingent components, and a portion of the pooled contingent interest can be selectively re-invested in the pooled fixed component. Also, the distribution of the pooled fixed and contingent interest can include distributing all of the pooled interest or only a portion of it, and the re-investment of the pooled fixed and contingent interest can include re-investing all of the pooled interest or only a portion of it. As another alternative, both the pooled fixed interest and pooled contingent interest can be distributed during the investment period rather than re-invested.

Investment Methods

Figure 8:
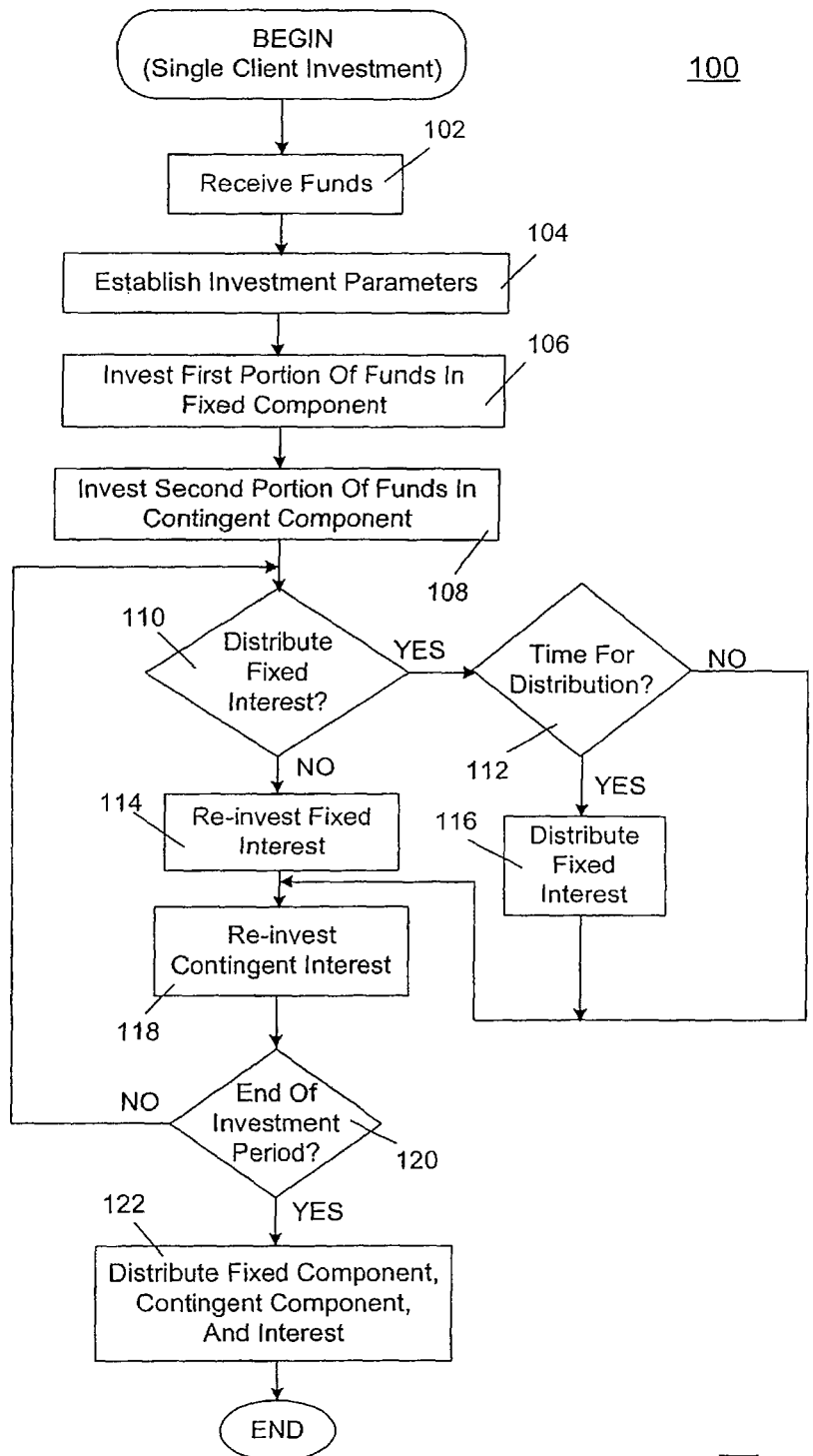
FIG. 8 is a flow chart of a method for providing an investment structure for a single client as shown in FIGS. 1-3.

FIG. 8 is a flow chart of a method 100 for providing an investment structure for a single client as shown in investment structure 10 in FIGS. 1 and 2. In method 100, the investment structure receives funds to be invested (step 102). Investment parameters are established for the investment structure (step 104). Based upon the parameters, the investment structure invests a first portion of the funds in the fixed component (step 106) and invests a second portion of the funds in the contingent component (step 108).

Investment parameters include, for example, the following: the fixed income securities for investing funds from the fixed component; the non-fixed income investments for investing funds from the contingent component; the time duration for the investment period; the percentage distribution of the funds between the fixed and contingent components; when to distribute the fixed interest, if at all, during the investment period; when to selectively distribute the pooled contingent interest for multiple clients, if at all, during the investment period; and the percentage of funds invested for each client in the pooled fixed and contingent components for multiple clients.

During the investment period, the investment structure determines whether to distribute the fixed interest (step 110) and, if so, whether it is time for distribution of the fixed interest (step 112). If it is time for distribution, the investment structure distributes the fixed interest to the client (step 116). Otherwise, if the client did not want the fixed interest distributed, the investment structure re-invests the fixed interest in the fixed component (step 114). It also re-invests the contingent interest in the contingent component (step 118).

During the investment process, the investment structure also determines, based upon the parameters, when to end the investment period (step 120). In an exemplary embodiment, the investment period is seven years; alternatively, other investment periods may be used. If the investment period has not ended, the investment structure continues to selectively distribute or re-invest the fixed interest and to re-invest the contingent interest. When the investment period has ended, the investment structure distributes the fixed component, the contingent component, and any remaining fixed and contingent interest (step 122).

Figure 9:
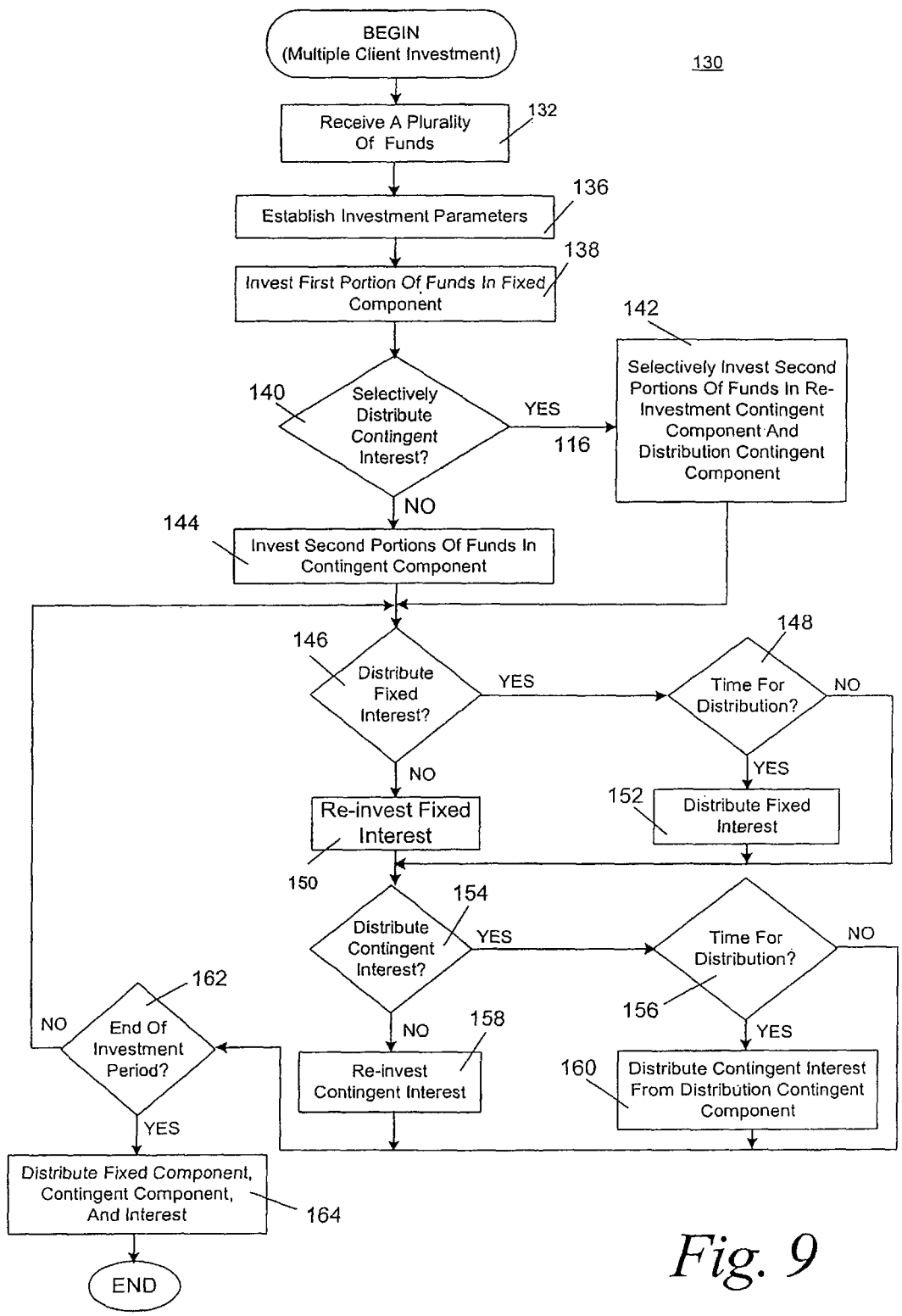
FIG. 9 is a flow chart of a method for providing an investment structure for multiple clients as shown in FIGS. 4-7.

FIG. 9 is a flow chart of a method 130 for providing an investment structure for multiple clients as shown in investment structures 30 and 60 in FIGS. 4-7. In method 130, the investment structure receives a plurality of funds to be invested (step 132). Investment parameters are established for the investment structure and can include those parameters identified above (step 136). Based upon the parameters, the investment structure invests a first portion of the funds in the pooled fixed component (step 138).

It also determines, based upon the parameters, whether to selectively distribute the pooled contingent interest (step 140). If all the pooled contingent interest is to be re-invested, the investment structure invests the second portions of the funds in the pooled contingent component (step 144). Otherwise, if part of the pooled contingent interest is to be distributed, the investment structure selectively invests the second portions of the funds in the pooled re-investment contingent component and the pooled distribution contingent component based upon which clients desire distribution of that interest (step 142).

During the investment period, the investment structure determines whether to distribute the pooled fixed interest (step 146) and, if so, whether it is time for distribution of the pooled fixed interest (step 148). If it is time for distribution, the investment structure selectively distributes the pooled fixed interest (step 152). Otherwise, if the clients, or a sub-set of them, did not want the pooled fixed interest distributed, the investment structure selectively re-invests the pooled fixed interest in the pooled fixed component (step 150).

It also determines whether to distribute the pooled contingent interest (step 154) and, if so, whether it is time for distribution of the pooled contingent interest (step 156). If it is time for distribution, the investment structure distributes the pooled contingent interest from the pooled distribution contingent component to selected clients (step 160). The investment structure also re-invests the pooled contingent interest in the pooled re-investment contingent component (step 158).

During the investment process, the investment structure also determines, based upon the parameters, when to end the investment period (step 162). If the investment period has not ended, the investment structure continues to selectively distribute or re-invest the pooled fixed interest and the pooled contingent interest. When the investment period had ended, the investment structure distributes the pooled fixed component, the pooled contingent component, and any remaining pooled fixed and contingent interest (step 164). The amounts to be distributed can be determined on a pro rata basis for each client depending upon the initial percentage of funds invested by each client among the total funds.

Computer Implementation

Figure 10:
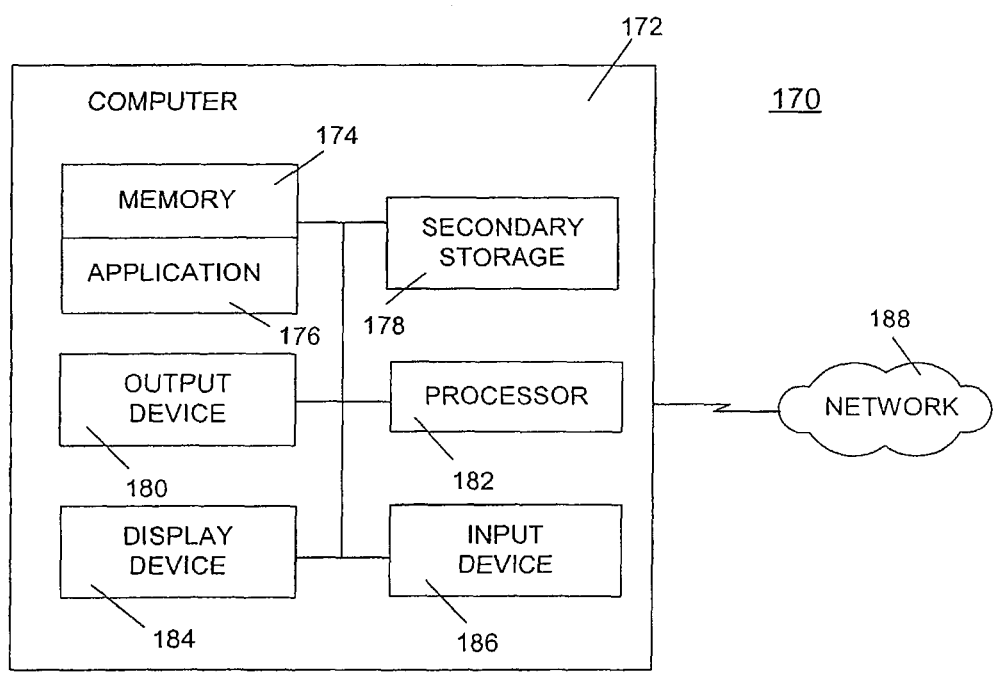
FIG. 10 is a diagram of an exemplary computer system for implementing the investment structures and methods shown in FIGS. 1-9.

FIG. 10 is a diagram of an exemplary computer system 170 for implementing the investment structures and methods shown in FIGS. 1-9. The investment structures and methods discussed above can be implemented using a software program and associated database for tracking and maintaining the funds invested according to the investment parameters. The software program can control the computer to execute the steps shown in the flow charts of FIGS. 8 and 9.

Use of a software program is not necessary to implement these investment structures and methods; however, it can facilitate the investment process, particularly when many clients are involved for the pooled components. For example, a database can specify the percentage of funds invested by each client and which clients desire distribution of the interest. A software program can then access the database at selected times and automatically determine the amount of interest to be distributed to the clients and, at the end of the investment period, the final amounts to be distributed. The software program can be used to determine the value of an individual investment at any time. In particular, to determine the value at any given time the software calculates the current value of the fixed portion with unpaid interest added, and adds the current value of the contingent portion.

System 170 includes a computer 172 illustrating exemplary hardware components for implementing, for example, software modules specifying investment structures and methods as discussed above. Computer 172 can include a connection with a network 188 such as the Internet or other type of network. Computer 172 typically includes a memory 174, a secondary storage device 178, a processor 182, an input device 186, a display device 184, and an output device 180.

Memory 174 may include random access memory (RAM) or similar types of memory, and it may store one or more applications 176 for execution by processor 182. Secondary storage device 178 may include a hard disk drive, floppy disk drive, CD-ROM drive, or other types of non-volatile data storage. Processor 182 may execute applications or programs stored in memory 174 or secondary storage device 178, or received from the Internet or other network 188. Input device 186 may include any device for entering information into computer 172, such as a microphone, digital camera, video recorder or camcorder, key pad, keyboard, cursor-control device, or touch-screen. Display device 184 may include any type of device for presenting visual information such as, for example, a computer monitor, flat-screen display, or display panel. Output device 180 may include any type of device for presenting a hard copy of information, such as a printer, and other types of output devices include speakers or any device for providing information in audio form.

Although computer 172 is depicted with various components, one skilled in the art will appreciate that this computer can contain additional or different components. In addition, although aspects of an implementation consistent with the present invention are described as capable of being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 172, to perform a particular method.

Legal Framework and Method for Investment Structures

Figure 11:
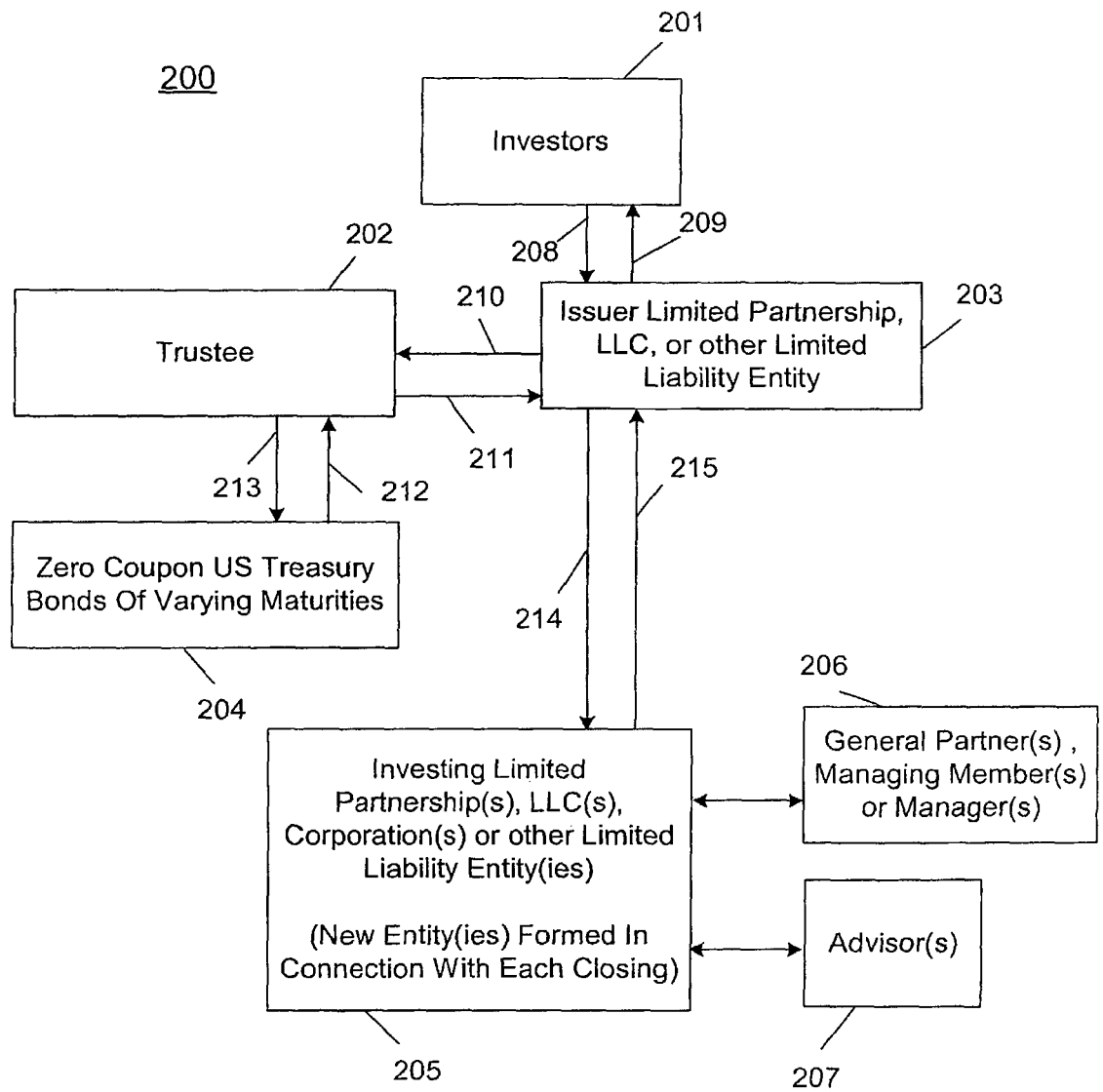
FIG. 11 is a diagram of an exemplary legal framework for implementing the investment structures and methods shown in FIGS. 1-9.

FIG. 11 is a diagram of an exemplary legal framework 200 for implementing the investment structures and methods shown in FIGS. 1-9. Although various types of legal frameworks and legal entities may be used to implement the investment structures and methods, framework 200 provides an example of one such framework and entities consistent with relevant laws governing investment of the funds. For example, framework 200 uses a trustee to invest the fixed component and one or more separate limited partnerships, limited liability companies, corporations or other limited liability entities 205 (managed by one or more advisors 207) to invest the contingent component. The same framework 200 can be used for a single client or for multiple clients having pooled funds.

Framework 200 includes investors 201, which represents the clients identified above, who provide capital for investment (208). Preferably, the investors 201 are provided Secured Participating Notes paying periodic minimum fixed interest and contingent interest, if any, and providing full return of principal on the maturity date if the Notes are held to maturity (209). The maturity date coincides with the end of the investment period identified above.

An issuer limited partnership, limited liability company, corporation or other limited liability entity 203 receives the capital for investment. The issuer limited partnership, limited liability company, corporation or other limited liability entity 203 provides a portion of the net proceeds at a closing (210) to a trustee 202, and provides the remainder of the net proceeds at a closing (214) to one or more investing limited partnerships, limited liability companies, corporations or other limited liability entities 205. Preferably, a new limited partnership, limited liability company, corporation or other limited liability entity 205 is formed in connection with each closing (214). The one or more investing limited partnerships, limited liability companies, corporations or other limited liability entities 205 provide for investment of the contingent component. Therefore, the one or more investing limited partnerships, limited liability companies, corporations or other limited liability entities 205 provides for the issuer limited partnership, limited liability company, corporation or other limited liability entity 203 receiving distributions semi-annually of profits, if any, of the one or more investing limited partnerships, limited liability companies, corporations or other limited liability entities 205 to pay contingent interest and distribution of residual assets of the one or more investing limited partnerships, limited liability companies, corporations or other limited liability entities 205 upon their liquidation immediately prior to the maturity date (215). The one or more investing limited partnerships, limited liability companies, corporations or other limited liability entities 205 interact with a general partner, managing member or manager 206 and one or more advisors 207. The general partner, managing member or investment manager 206 select the one or more advisors 207 that for manage and invest the capital in the contingent component.

In the example shown in FIG. 11, a trustee 202 invests the fixed component. However, a managing member, general partner or investment manager may be the fixed component investing entity. The trustee (or other fixed component investing entity) 202 holds, for example, zero coupon United States Treasury Bonds of varying maturities 204 for investing the fixed component. Alternatively, certificate of deposits, municipal bonds, corporate bonds or other fixed investments may be used for investing the fixed component. The trustee 202 invests the portion of the net proceeds (210) in the bonds 204 to satisfy payment of the minimum (fixed) interest and return of principal at the maturity date (213). Preferably, the proceeds are separately pledged at each closing to secure payment on the Notes issued at the relevant closing.

The bonds 204 thus provide to the trustee 202 the minimum (fixed) interest and return of principal on the maturity date (212). The trustee 202 in turn provides the minimum (fixed) interest and return of principal on the maturity date (211) to the issuer limited partnership, limited liability company, corporation or other limited liability entity 203, which returns it (209) to the investors 201.

Figure 12:
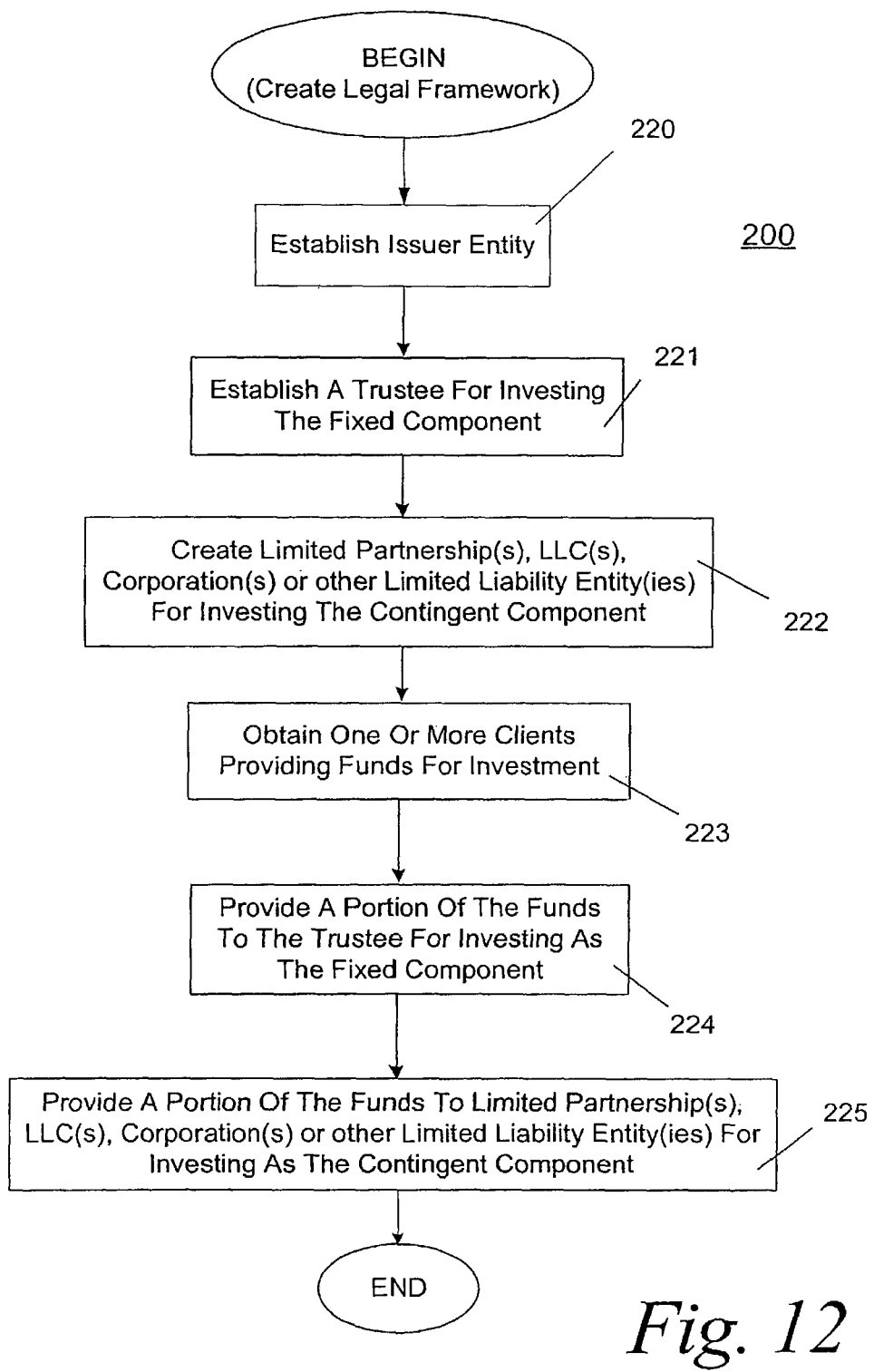
FIG. 12 is a flow chart illustrating a method for implementing the legal framework shown in FIG. 11.

FIG. 12 is a flow chart illustrating a method 220 for implementing the legal framework 200 shown in FIG. 11. The issuer 203 (e.g., limited partnership, limited liability company, corporation or other limited liability entity) is established (step 220). As described above, the issuer 203 receives the funds (capital) from the investors 201 and provides the returns to the investors 201. The trustee 202 or other legal entity is established for investing the fixed component (step 221). One or more investing limited partnerships, limited liability companies, corporations or other limited liability entities 205 or other legal entities are also established for investing the contingent component (step 222). One or more clients (investors 201) are obtained that provide funds for investment (step 223). The funds are provided by the clients to the issuer 203. The issuer preferably provides a portion of the funds to the trustee (or other fixed component investing entity) 202 for investing as the fixed component (step 224) and another portion of the funds to one or more investing limited partnerships, limited liability companies, corporations or other limited liability entities 205 for investing as the contingent component (step 225). Additional aspects and variations of the investment process using legal framework 200 can occur as described above.

Figure 13:
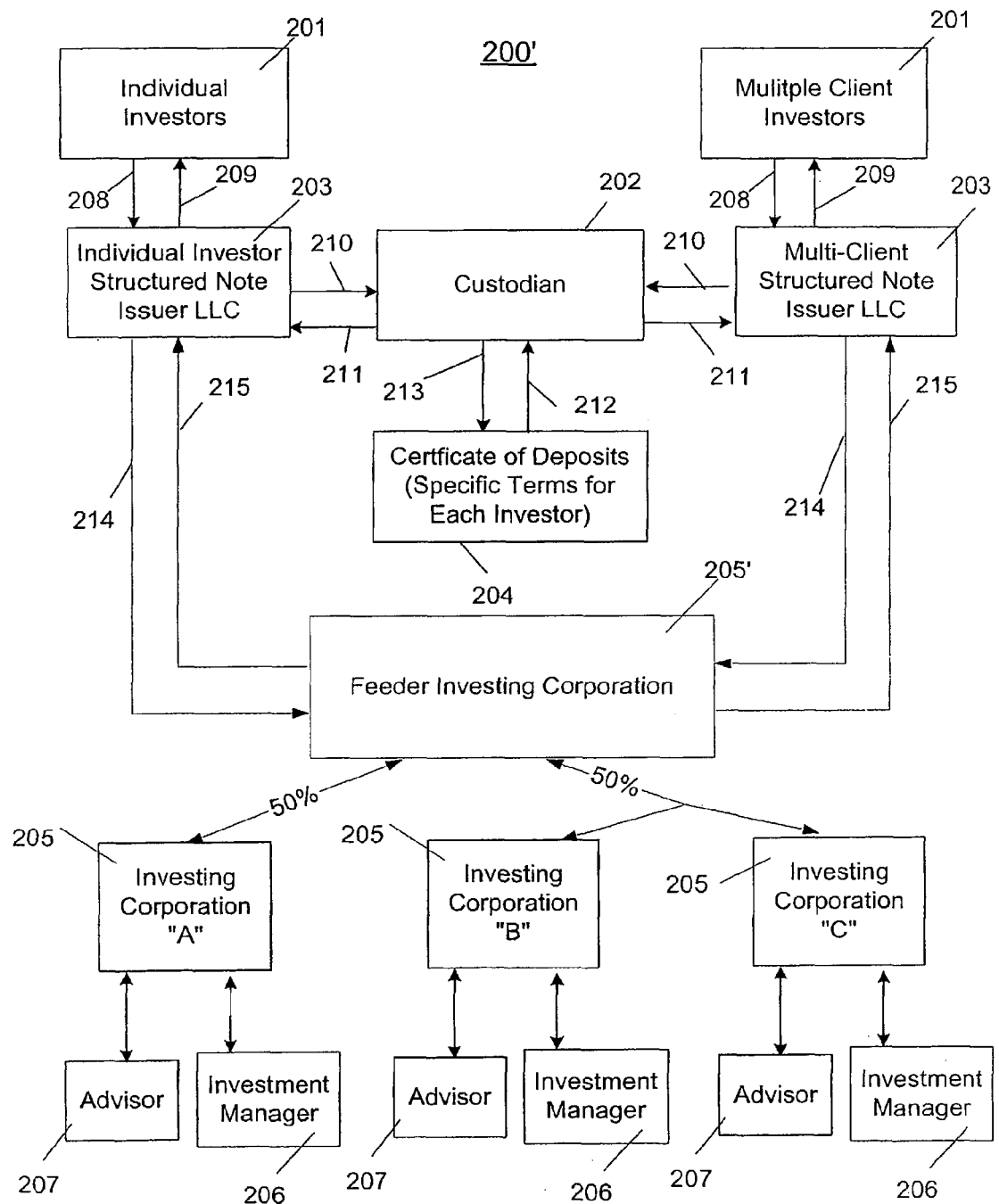
FIG. 13 is a diagram of another exemplary legal framework for implementing the investment structures and methods shown in FIGS. 1-9.

FIG. 13 is diagram illustrating another exemplary legal framework 200' for implementing the investment structures and methods shown in FIGS. 1-9. The exemplary legal framework 200' includes two issuer LLCs 203. One issuer LLC 203 issues individual investor structured notes to individual investors 201. The other issuer LLC 203 issues multiple investor (i.e., non-individual investors) structured notes to multiple investors (e.g., institutional investors) 201. In this example, the fixed component is a certificate of deposit (CD) and the fixed component entity 202 is a corporate custodian from whom the issuers 203 purchase the CDs. The corporate custodian 202 holds the CDs, which preferably have specific terms for each investor. The percentage of the investor 201 funds invested in the CDs (i.e., the fixed component) may vary, as described above.

The contingent component investing entities 205 are investing corporations "A" through "C". These investing corporations 205 may be, for example, off-shore funds (e.g., Cayman Island funds). In the example shown in FIG. 13, there are three investing entities 205. However, any number of investing entities may be used. Each investing corporation 205 preferably has an investment manager 206 that selects an advisor(s) 207 for managing and investing a share of the contingent funds. The percentage of the investor 201 funds invested in the investing corporations 205 (i.e., the contingent component) may vary, as described above.

In the example shown in FIG. 13, there is a feeder investing corporation 205' into which the contingent component is fed by the issuers 203. The feeder investing corporation 205' may be any limited liability entity, such as an Ltd. or a C Corporation. The feeder corporation 205' may also be invested in by outside investors (i.e., investors that do not purchase a structured note from the issuers 203). The feeder corporation 205' preferably provides varying percentages of the contingent component to the investing corporations "A"-"C" 205. For example, the feeder corporation 205' may provide 50% of the contingent component to investing corporation "A" 205 and the remaining 50% of the contingent component to investing corporations "B" and "C" 205. Consequently, if, for example, 80% of the investor funds are invested in the fixed component, 10% of the investor funds are invested in the investment corporation "A" 205 and 10% of the investor funds are invested in investment corporation "B" and "C" 205 together. Any variety and combination of percentages of the funds may be provided to the investing entities 205 for the contingent component.

While the present invention has been described in connection with an exemplary embodiment, it will be understood that many modifications will be readily apparent to those skilled in the art, and this application is intended to cover any adaptations or variations thereof. For example, different types of investments, percentages for the portions of the funds, distribution times for the interest, investment periods, and other investment parameters may be used without departing from the scope of the invention. This invention should be limited only by the claims and equivalents thereof.

What is claimed is:

1. A computer-implemented method comprising:
   receiving principal funds from a plurality of individual investors to be invested in a structured note, wherein the receiving of principal funds utilizes at least one processor and memory, the principal funds are received by a first issuer limited liability entity and the structured note includes parameters specifying that principal funds will be invested in a fixed component of the structured note and a contingent component of the structured note, guarantees the payment of periodic minimum fixed interest, the payment of periodic contingent interest and the return of the principal funds upon reaching a maturity date of the structured note, and at least one processor executes instructions on memory to track and maintain the received principal funds in an associated database;

receiving principal funds from a plurality of multiple-investor entities to be invested in the structured note, wherein the receiving of principal funds utilizes at least one processor and memory, wherein the principal funds are received by a second issuer limited liability entity, and at least one processor executes instructions to track and maintain the received principal funds in an associated database;

investing a first portion of the received principal funds in a fixed component of the structured note that generates an amount equal to the received principal funds by the maturity date plus a periodic fixed interest based on parameters of the structured note, wherein the investing a first portion of the received principal funds utilizes at least one processor and memory, wherein the investing the first portion of the principal funds includes:

the first issuer limited liability entity providing a fixed component investing entity with a first portion of the principal funds from the plurality of individual investors, wherein at least one processor executes instructions to determine the first portion of the principal funds from the plurality of individual investors; and the second issuer limited liability entity providing the fixed component investing entity with a first portion of the principal funds from the plurality of multiple-investor entities, wherein at least one processor executes instructions to determine the first portion of the principal funds from the plurality of multiple-investor entities, wherein the fixed component entity invests the provided first portions in a fixed investment;

investing a second portion of the received principal funds in a contingent component of the structured note that generates periodic contingent interest based on parameters of the structured note, wherein the investing a second portion of the received principal funds utilizes at least one processor and memory, wherein the investing the second portion comprises:

the first issuer limited liability entity providing a feeder investing limited liability entity a second portion of the principal funds from the plurality of individual investors, wherein at least one processor executes instructions to determine the second portion of the principal funds from the plurality of individual investors;

the second issuer limited liability entity providing the feeder investing limited liability entity a second portion of the principal funds from the plurality of multiple-investor entities, wherein at least one processor executes instructions to determine the second portion of the principal funds from the plurality of multiple-investor entities; and the feeder investing limited liability entity selectively investing the provided second portions in a plurality of investing limited liability entities;

determining a re-investment portion of the fixed interest based on parameters of the structured note, wherein at least one processor determines the re-investment portion of the fixed interest using instructions stored in memory;

determining a re-investment portion of the contingent interest based on parameters of the structured note, wherein at least one processor determines the re-investment portion of the contingent interest using instructions stored in memory;

re-investing the re-investment portion of the fixed interest in the fixed component of the structured note, wherein the re-investing the re-investment portion of the fixed interest in the fixed component of the structured note utilizes at least one processor and memory;

re-investing the re-investment portion of the contingent interest, if any, in the contingent component of the structured note, wherein the re-investing the re-investment portion of the contingent interest in the contingent component of the structured note utilizes at least one processor and memory;

periodically distributing the periodic minimum fixed interest, wherein the periodically distributing the periodic minimum fixed interest utilizes at least one processor and memory;

periodically distributing the periodic contingent interest, wherein at least one processor determines whether to distribute the periodic contingent interest and when to distribute the periodic contingent interest based on instructions stored in memory; and upon reaching the maturity date, distributing an amount equal to the received principal funds, wherein the distributing an amount equal to the received principal funds utilizes at least one processor and memory.

2. The computer-implemented method of claim 1 wherein the first issuer limited liability entity and the second issuer limited liability entity are both limited liability companies.

3. The computer-implemented method of claim 1 wherein the feeder investing limited liability entity is a corporation.

4. The computer-implemented method of claim 1 wherein the fixed component investing entity is a custodian.

5. The computer-implemented method of claim 1 wherein the fixed component investing entity is a trust.

6. The computer-implemented method of claim 1 wherein the plurality of investing limited liability entities are corporations.

7. The computer-implemented method of claim 1 wherein the feeder investing limited liability entity selectively investing the provided second portions in a plurality of investing limited liability entities includes the feeder investing limited liability entity investing different percentages of the provided second portions in the plurality of investing limited liability entities.

8. The computer-implemented method of claim 1 wherein:
the plurality of investing limited liability entities include one or more re-investing limited liability entities,
the feeder investing limited liability entity selectively investing the provided second portions in a plurality of investing limited liability entities includes the feeder investing limited liability entity selectively investing in the one or more re-investing limited liability entities based on the determined re-investment portion of the contingent interest, and
the re-investing the re-investment portion of the contingent interest in the contingent component includes the one or more re-investing limited liability entities re-investing the re-investment portion of the contingent interest.

9. The computer-implemented method of claim 1 wherein the determining a re-investment portion of the contingent interest is also determined based on preferences of the individual investors and multiple-investor entities.

10. A computer-implemented method comprising:
receiving principal funds from a plurality of individual investors to be invested in a structured note, wherein the receiving principal funds utilizes at least one processor and memory, the principal funds are received by a first issuer limited liability entity and the structured note includes parameters specifying that principal funds will be invested in a fixed component of the structured note and a contingent component of the structured note, guarantees the payment of periodic minimum fixed interest, the payment of periodic contingent interest and the return of the principal funds upon reaching a maturity date of the structured note, and at least one processor executes instructions on memory to track and maintain the received principal funds in an associated database;

receiving principal funds from a plurality of multiple-investor entities to be invested in the structured note, wherein the receiving of principal funds utilizes at least one processor and memory, wherein the principal funds are received by a second issuer limited liability entity, and at least one processor executes instructions on memory to track and maintain the received principal funds in an associated database;

investing a first portion of the received principal funds in a fixed component of the structured note that generates an amount equal to the received principal funds by the maturity date plus a periodic fixed interest based on parameters of the structured note, wherein the investing a first portion of the received principal funds utilizes at least one processor and memory, wherein the investing the first portion of the principal funds includes:

the first issuer limited liability entity providing a fixed component investing entity with a first portion of the principal funds from the plurality of individual investors, wherein at least one processor executes instructions to determine the first portion of the principal funds from the plurality of individual investors; and the second issuer limited liability entity providing the fixed component investing entity with a first portion of the principal funds from the plurality of multiple-investor entities, wherein at least one processor executes instructions to determine the first portion of the principal funds from the plurality of multiple-investor entities, wherein the fixed component entity invests the provided first portions in a fixed investment;

determining a re-investment portion and a distribution portion of a contingent component of the structured note, wherein at least one processor determines the re-investment portion and the distribution portion of the contingent component using instructions stored in memory investing a second portion of the received principal funds in the contingent component of the structured note that generates periodic contingent interest based on parameters of the structured note, wherein the investing a second portion of the received principal funds utilizes at least one processor and memory, wherein the investing the second portion comprises:

the first issuer limited liability entity providing a feeder investing limited liability entity a second portion of the principal funds from the plurality of individual investors wherein at least one processor executes instructions to determine the second portion of the principal funds from the plurality of individual investors;

the second issuer limited liability entity providing the feeder investing limited liability entity a second portion of the principal funds from the plurality of multiple-investor entities, wherein at least one processor executes instructions to determine the second portion of the principal funds from the plurality of multiple-investor entities; and the feeder investing limited liability entity selectively investing the provided second portions in a plurality of investing limited liability entities, wherein the plurality of investing limited liability entities include re-investing entities that re-invest contingent interest and distributing entities that distribute contingent interest, and the selectively investing invests the provided second portions in re-investing entities and distributing entities based on the parameters of the notes; determining a re-investment portion of the fixed interest based on parameters of the structured note, wherein at least one processor determines the re-investment portion of the fixed interest using instructions stored in memory;

re-investing the re-investment portion of the fixed interest in the fixed component of the structured note, wherein the re-investing the re-investment portion of the fixed interest in the fixed component of the structured note utilizes at least one processor and memory;

periodically distributing the periodic minimum fixed interest, wherein the periodically distributing the periodic minimum fixed interest utilizes at least one processor and memory;

periodically distributing the periodic contingent interest, if any, wherein at least one processor determines whether to distribute the periodic contingent interest and when to distribute the periodic contingent interest based on instructions stored in memory; and upon reaching the maturity date, distributing an amount equal to the received principal funds, wherein the distributing an amount equal to the received principal funds utilizes at least one processor and memory.

\* \* \* \* \*